Oct. 23, 1923.

L. LOGAN 1,471,342

MEANS FOR CONTROLLING PROCESSES OF PRODUCTION

Filed April 30, 1920  2 Sheets-Sheet 1

Inventor.
Lloyd Logan
by Heard Smith & Tennant
Attys.

Oct. 23, 1923.  
L. LOGAN  
1,471,342  
MEANS FOR CONTROLLING PROCESSES OF PRODUCTION  
Filed April 30, 1920  2 Sheets-Sheet 2
Fig. 5.
Fig. 6.
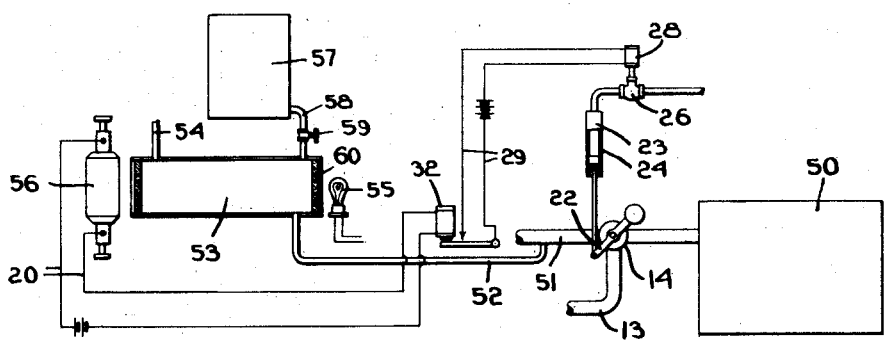
Fig. 7.
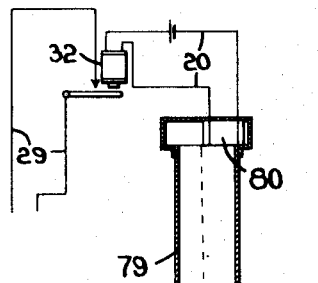
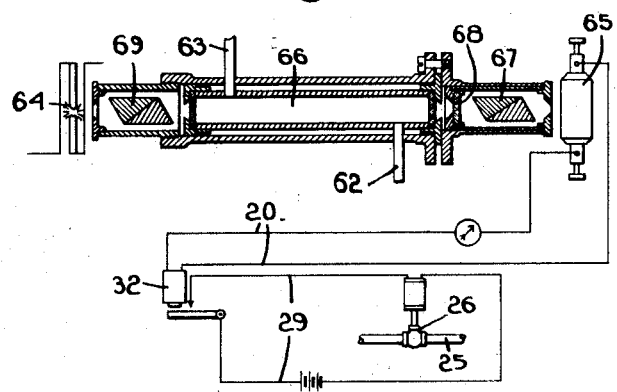
Fig. 8.
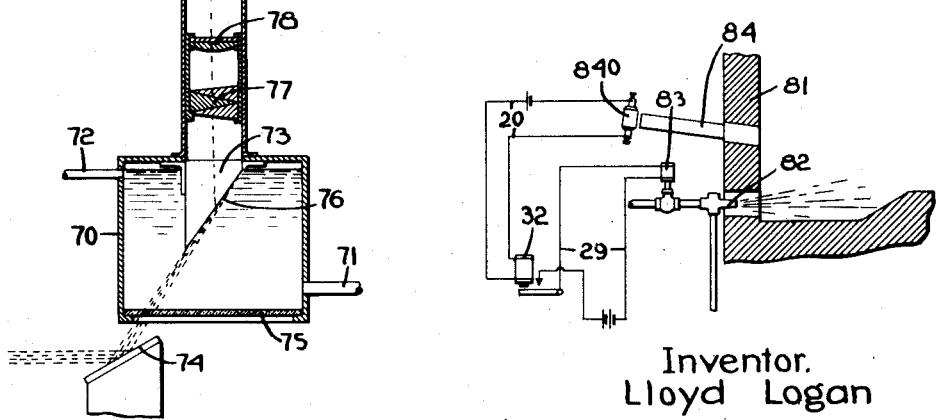
Inventor.
Lloyd Logan
by Heard Smith & Tennant.
Attys.

Patented Oct. 23, 1923.

1,471,342

UNITED STATES PATENT OFFICE.

LLOYD LOGAN, OF ARLINGTON, MASSACHUSETTS.

MEANS FOR CONTROLLING PROCESSES OF PRODUCTION.

Application filed April 30, 1920. Serial No. 377,780.

*To all whom it may concern:*

Be it known that I, LLOYD LOGAN, a citizen of the United States, residing at Arlington, county of Middlesex, State of Massachusetts, have invented an Improvement in Means for Controlling Processes of Production, of which the following description, in connection with the accompanying drawing, is a specification, like characters on the drawing representing like parts.

This invention has for its object the provision of means for automatically controlling a production process by variations in radiant energy caused by variations in some factor or factors affecting said production process for the purpose of maintaining a predetermined character in the product resulting from said process.

The invention is capable of use in connection with a wide range of production processes and will be embodied in various forms depending on the character of the process. The particular factor or factors of the process which are made use of to obtain the variations in radiant energy will also vary, depending on the character of the process.

Moreover, the particular character of radiant energy which is made use of in practicing my invention will vary depending on the nature of the process with which it is used. In many processes radiant energy in the form of light will be found most serviceable for the purpose of the invention, but I desire to state that the invention is not limited to the use of this form of radiant energy.

Merely as illustrating some uses to which the invention may be put, I would refer to its use as controlling the manufacture of chemical products by making use of variations in an optical quality of a sample of the product during some stage of manufacture for the purpose of controlling the process thereby to eliminate the formation of any undesirable constituents in the products; or its use in obtaining temperature control by making use of variations in the intensity of light emitted from or transmitted through material subjected to the temperature which is being controlled.

Various other uses of the invention will readily suggest themselves to those who are skilled in the art.

In order to give an understanding of the invention, I have illustrated in the drawings several different embodiments thereof, each showing a different use to which the invention may be put.

In the drawings, Fig. 1 is a more or less diagrammatic view showing one form of my invention as applied to the detection of arsenic in the process of manufacturing sulphuric acid and the control of such manufacture;

Fig. 5 is a more or less diagrammatic view showing a different embodiment of the invention;

Fig. 6 is a view showing the invention as it might be used in connection with the producton of liquids which rotate the plane of polarization of light;

Fig. 7 illustrates how the invention might be used where the apparatus is designed to operate by variations in the refractive index of the liquid being manufactured or controlled.

Fig. 8 shows an embodiment of my invention constructed to provide temperature control.

Figure 1:
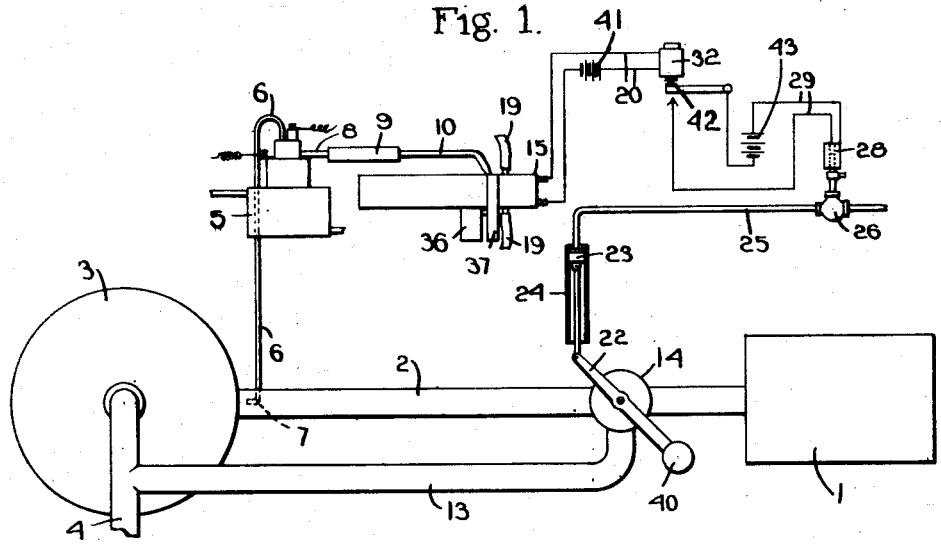

Referring first to Fig. 1 which shows my invention as it might be employed in connection with the contact process of sulphuric acid manufacture, 1 indicates the so-called catalyst chamber of an apparatus for manufacturing sulphuric acid and which contains the usual catalyst, and 2 is the inlet pipe through which the sulphur dioxide gas is delivered to the chamber. This gas may be formed in any suitable or usual way and is passed through a scrubber 3 for the purpose of cleansing it prior to its delivery to the pipe 2. 4 indicates an inlet pipe through which the gas is delivered to the scrubber.

The parts above referred to are such as are usually found in apparatus of this type and form no part of my present invention.

The apparatus shown in Fig. 1 includes a detecting element or indicator arranged to receive a sample of the material flowing through the pipe 2, which detector is constructed to detect and give indication of the presence in said sample of any undesirable constituent in the material.

Said apparatus also involves means which will be hereinafter described that are rendered operative by such indicating device when it shows the presence of such undesirable substance to regulate the production of the product. The detecting element may be constructed in various ways depending on the character of the material being manufactured.

In Fig. 1 I have shown a detecting element or indicator on the order of the so-called "Marsh" apparatus by which any arsenic or arsenic compound in the sample taken from the pipe 2 is converted into arsine and is passed through a jet burner at which ignition takes place, the flame being arranged to impinge on a quartz, glass or like transparent screen.

As is well known, the presence of any arsenic or arsine will result in the deposit of a black stain upon the screen, thus indicating the presence of this undesirable element.

The Marsh apparatus of itself is not new with me, but in my invention, I have provided means whereby the formation of the dark stain operates to control or interrupt the manufacturing process.

The Marsh apparatus, which may be of usual type, comprises an electrolytic cell 5 of the type adapted to generate hydrogen gas. This cell has connected thereto a sampling pipe 6 which leads into the pipe 2, as shown at 7, so that a sample of the material flowing through the pipe 2 will be taken by the pipe 6 and delivered to the electrolytic cell. The cell has a delivery pipe 8 leading to a chamber 9 containing material adapted to absorb moisture, sulphur dioxide gas or other constituents which will unfavorably affect the testing process, and from the chamber 9 a pipe 10 leads to the jet burner 11 at which combustion takes place.

So long as the sulphur dioxide gas which is taken from the sampling pipe 6 is free from arsenic, then hydrogen only will be generated by the electrolytic cell and delivered to the burner 11, but if the sulphur dioxide gas contains arsenic in any form, then arsine will be generated in the electrolytic cell so that the gas which is delivered through the pipes 8 and 10 is hydrogen containing more or less arsine.

Situated adjacent the burner 11 is a transparent screen 12 against which the flame impinges. So long as hydrogen only is being generated, the flame will produce no stain on the screen 12, but the presence of arsenic or arsine in the gas will result in the deposit of a black stain on the screen 12.

Figure 4:
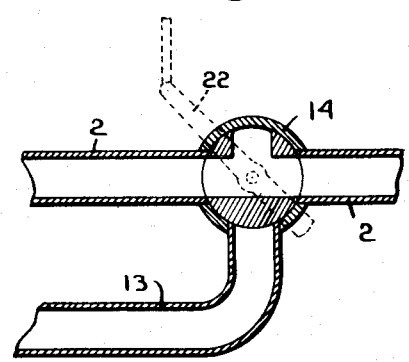
Fig. 4 is a sectional view of the controlling valve.

I have provided herein means whereby whenever the black stain is formed on the screen 12 the flow of gas to the catalyst chamber 1 will be interrupted and gas flowing through said pipe 2 will be returned to the scrubber for further treatment. For this purpose, I provide a by-pass pipe 13 leading from a valve 14 in the pipe 2 to the pipe 4 and provide means which becomes operative when the black stain is formed on the screen 12 for operating the valve thereby to close communication between the pipe 2 and the catalyst chamber and open communication between said pipe and the by-pass 13. A valve capable of accomplishing this is indicated in Fig. 4.

Figure 2:
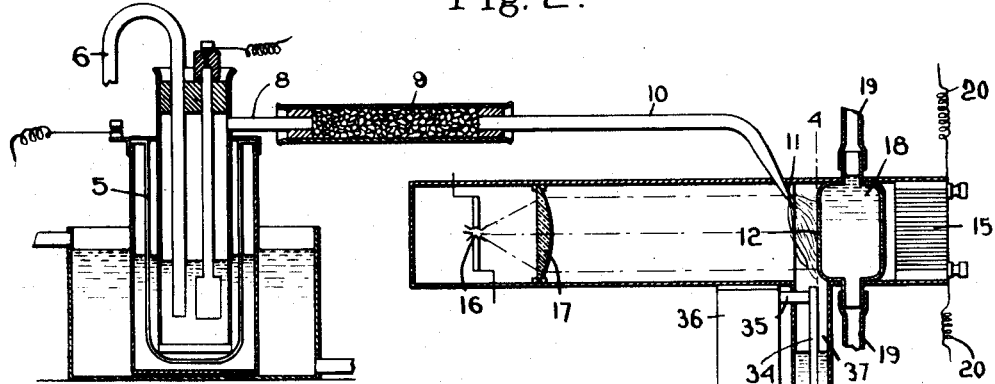
Fig. 2 is an enlarged sectional view of the detector element.
Figure 3:
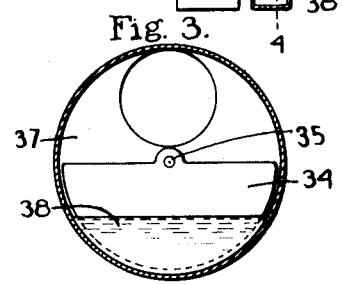
Fig. 3 is a sectoin on the line 4—4, Fig. 2.

In the construction shown in Figs. 1, 2 and 3, the valve 14 is operated by variations in the capacity of the screen 12 for absorbing light. One simple mechanism for this purpose comprises a source of light 16 arranged to project a beam of light onto and through the screen 12 and a light sensitive cell 15, such, for instance, as a selenium cell, placed in position to receive the light transmitted through the screen 12. The light 16 is shown as in a tube which contains a condensing lens 17 for throwing the beam of light through the screen 12. The amount of light which is received on the selenium cell 15 will vary according to the capacity of the screen for transmitting light, and this will depend upon the presence or absence of the dark stain caused by the arsenic.

The selenium cell 15 is in a circuit 20 containing a source of electrical energy 41 and also a relay 32. This relay controls a contact 42 in a second circuit 29 having a source of electrical energy 43 therein. The relay 32 is constructed so that so long as the normal current is flowing in the circuit 20, the contact 43 in the circuit 29 will be open, but when the current in the circuit 20 drops below a predetermined point, the relay 32 becomes inoperative to hold the circuit 29 open and the latter will close. Means are provided whereby when the circuit 29 closes the valve 14 will be actuated to interrupt the delivery of material to the chamber 1.

As is well known, the resistance of the selenium cell varies with the amount of light received thereby and, therefore, the resistance of the circuit 20 will be least when the maximum light is transmitted through the screen 12 onto the selenium cell and will be increased as the amount of light diminishes. So long as the maximum light is transmitted through the screen, the reduced resistance of the selenium cell permits the relay to become operative to hold the circuit 29 open, but if a black stain is formed on the screen thereby cutting off some of the light from the cell 15, the resistance of the circuit will increase so that the relay 32 will close the circuit 29. The circuit 29 is shown as having a solenoid 28 therein which when energized operates to shift the valve 14. For this purpose I have shown said valve 14 as provided with an operating lever 22 having a counterweight 40 thereon and also having a piston 23 connected thereto which operates in a cylinder 24. A pipe 25 connects the cylinder 24 with a suitable source of compressed air, and this pipe has a valve 26 therein which is normally held closed by a spring, but which is adapted to be opened when the solenoid 28 is energized. When, therefore, the valve 26 is open, the compressed air will force the piston 23 downwardly, thereby rotating the valve through 90° and cutting off communication between the pipe 2 and chamber 1 and opening communication between said pipe and by-pass 13.

From the above, it will be seen that whenever any arsenic is present in the sample, the consequent stain on the screen 12 will increase the resistance of the selenium cell sufficiently to permit the circuit 29 to be closed thereby opening the valve 26 and causing the valve 14 to be shifted, as above described.

The gas containing arsenic will, therefore, be returned to the scrubber for further treatment intended to have the effect of removing the arsenic.

The apparatus above described, therefore, provides means for automatically interrupting the delivery of material or gas to the catalyst chamber 1 whenever arsenic is present. It is desirable, of course, that after the arsenic or other impurities have been removed from the sulphur dioxide gas the valve 14 should be operated to admit gas again to the catalyst chamber 1, and I have, therefore, provided means for cleaning the screen periodically, so that after the delivery of the sulphur dioxide gas to the catalyst chamber has been interrupted for a certain length of time another test may be made to see if said gas still contains arsenic. This cleaning of the screen 12 is accomplished by a transparent wiper 34 mounted on a rotatable shaft 35 that is actuated by a suitable time mechanism indicated generally at 36 and constructed to rotate the shaft 35 once at predetermined time intervals. The wiper 34 normally occupies the chamber 37 situated beneath the screen 12 and containing a bleaching powder solution 38. During the rotation of the wiper it will wipe over the surface 12 and remove any stain therefrom, and as soon as the stain has been removed, the light will pass freely through the screen with the result that the relay 32 will become operative to open the circuit 29, thus allowing the valve 26 to close. When this occurs, the valve 14 will be turned into the position shown in Fig. 4 by means of the counterweight 40. If there is no further arsenic in the sulphur dioxide gas, then the operation will continue uninterrupted, but if there is still arsenic present, then the black stain will be again produced on the screen 12 and the apparatus will again operate automatically to interrupt the flow of gas to the chamber 1.

The screen 12 is shown in the form of a hollow chamber of quartz, glass or other suitable material which is provided with a chamber 18 through which cooling water may be circulated by means of suitable pipes 19 for the purpose of keeping the screen cool.

The above-described apparatus exemplifies an embodiment of my invention in which the control of the process of producing an article is effected by variations in the capacity of an element to absorb light due to the presence of the undesirable material.

My invention may also be exemplified in an apparatus which is constructed so that the control will be effected by means which responds selectively to light of certain wave length. An apparatus of this sort is illustrated in Fig. 5 which shows an arrangement by which certain objectionable constituents when present will yield on treatment with chemical indicators a colored product. If, in such case, the presence of the objectionable constituents yields a red solution or product which will transmit only or chiefly red light rays, then such solution could be used in connection with a source of light free from red rays and a light-sensitive cell for controlling the product. For instance, in Fig. 5, 50 indicates a vat to receive the product which is delivered thereto through a pipe 51, and 14 is a valve in said pipe controlling communication between the pipe 51 and the vat and between the pipe 51 and a by-pass 13 which leads back to some portion of the apparatus so that when the valve 14 closes communication to the vat, the liquid flowing in the pipe 51 will be carried back to the apparatus for some further treatment.

The pipe 51 has a sampling pipe 52 connected thereto through which a sample may be taken to a tank or chamber 53, said tank or chamber having an overflow pipe 54 extending therefrom. So long as there is liquid flowing in the pipe 51, therefore, a small portion of said liquid will be taken through the sampling pipe and through the chamber 53 so that the liquid in the chamber 53 will always represent the character of the liquid flowing in the pipe 51. This chamber 53 is situated between a source of light 55 and a light-sensitive cell 56, and the ends of the chamber are transparent to permit the light to pass through the liquid therein. Hence the quality or character of the light received by the light-sensitive cell 56 will depend upon the character of the liquid in the chamber 53. The chamber 53 has a vessel 57 communicating therewith through a pipe 58 having a valve 59 therein, and the vessel 57 will contain some reagent which when introduced into the liquid in the chamber 53 will cause a discoloration of the liquid in said chamber if certain undesirable constituents are present.

For instance, if it is assumed that the undesirable constituent is ferric iron, then the reagent in the vessel 57 may be such as to produce a red coloration in the liquid when the ferric iron is present. In this case, I propose to place a color filter 60 between the source of light 55 and the chamber 53, which color filter will be constructed to exclude the red ray. Thus a selective action is produced and the light-sensitive cell is normally subjected to the light rays minus the red rays. If, however, ferric iron is present in the sample liquid taken from the pipe 51, then there will be a red coloration in the liquid in the chamber 53 which will change the character of the light received by the sensitive cell. This light-sensitive cell is connected in a circuit 20 having a relay 32 therein, and the relay is arranged to close a circuit 29 which has the valve-actuating solenoid 28 therein as described with reference to Fig. 1.

When this solenoid 28 is energized, it is arranged to open a valve 26 in the pipe 25 leading to a cylinder 23 which has the piston 24 therein that is connected to the valve-actuating lever 22 by which the valve 14 is operated.

The construction above described is such that so long as the liquid in the chamber 53 does not contain any of the ferric iron or other undesirable constituent, the character of the light which is received by the light-sensitive cell is such that the relay 32 will be maintained operative to hold the circuit 29 open, but if there is a red coloration produced in the liquid in the chamber 53 due to the presence of the ferric iron, then the action of the light on the light-sensitive cell will result in causing the relay 36 to close the circuit 29, thus opening the valve 26 with the result that the compressed air or other motive fluid will be delivered to the cylinder 24, thus operating the valve 14 and closing communication between the pipe 51 and the vat 50 and opening communication between said pipe and the bypass 13.

In Fig. 6 I have illustrated an embodiment of the invention which is adapted to be used in the production of liquids that operate to rotate the plane of polarization of light and the control is effected by variations in the intensity of the polarized light transmitted according to variations in the product.

In the construction shown in Fig. 6, a polariscope is employed having a chamber 66 therein which is connected by means of a sampling pipe 62 to a pipe or conduit through which the solution under question is flowing, so that a sample of said solution will be continuously flowing through the chamber 66, the latter having an overflow pipe 63.

64 indicates a source of light situated at one end of the polariscope, and 65 is a light-sensitive cell situated to receive the light transmitted through the polariscope. This polariscope has the usual polarizer indicated at 67 and end-point device indicated at 68, as well as the usual analyzer indicated at 69. The light-sensitive cell is connected in the circuit 20 having the relay 32 therein, which relay actuates a circuit 29 that controls a solenoid valve 26. This valve 26 may be in a pipe 25 leading to a cylinder or other motor which is designed to actuate a valve or device which controls the production of the solution in question.

So long as the solution is normal the light which is received on the light-sensitive cell through the polariscope will be sufficient so that the relay 32 will hold the circuit 29 open, but if the solution passing through the polariscope is below standard or contains some undesirable constituent which effects the polarization of the light, then the light-sensitive cell will be effective in causing the relay 32 to close the circuit 29 so as to actuate the valve 26 and thus effect the desired control in the production of the liquid.

This apparatus is especially useful in connection with the manufacture of sugar or similar materials which rotate the plane of polarization of light.

In Fig. 7 I have shown a different embodiment of the invention which is designed so that the control is effected through variations in the refractive index of the liquid being controlled. In said figure 70 indicates a tank or vessel having a transparent bottom and connected by a sampling pipe 71 to a pipe through which the liquid being produced is flowing so that a sample of said liquid is continuously flowing through the vessel 70, the latter having the overflow 72.

73 is a prism situated in the tank 70, and 74 is a reflector situated to reflect a ray of light through the transparent bottom 75 of the vessel onto the inclined face 76 of the prism at substantially grazing incidence. The light which is thus received on the face 76 of the prism will be refracted by the prism and will pass through a compensator 77 and a condensing lens 78 by which the ray is condensed and focussed at the upper end of a supporting tube 79. Situated at the end of the tube 79 is a light sensitive cell 80 which is connected to a circuit 20. The prism 76 is so constructed and the reflector 74 so situated that under normal conditions the limiting rays of the refracted beam of light will fall just outside of the light sensitive cell 80 so that there will be total extinction of the light where the cell is and the latter will, therefore, not be affected by light rays.

The total refraction of the beam of light is that due to the refraction of the light in passing through the liquid in the vessel added to the refraction caused by the prism 73, and the apparatus is constructed so that when the liquid in the vessel 70 is normal the refraction of the light due to the liquid will cause the beam to have grazing incidence with the face 76 of the prism. If the liquid changes in density from normal, then there will be a corresponding change in the refractive index of the liquid, and this will result in a change of location of the limiting rays. Hence if the liquid increases in density, the limiting rays will move to the right, Fig. 7, onto the sensitive cell 80, thus subjecting the latter to the action of light. This will cause the relay 32 to operate thereby to close the circuit 29, and the closing of this circuit will operate in any suitable way to control the manufacturing operation.

In Fig. 8 I have shown another embodiment of my invention which is used to control the supply of fuel oil to a furnace. In this construction 81 indicates a furnace having a burner 82 by which the fuel oil is delivered to the furnace and at which combustion takes place. This burner is controlled by an electrically-operated valve 83. 84 is an optional pyrometer arranged to receive light rays from material in the furnace being treated. Associated with the pyrometer is a light sensitive cell 840 in a circuit 20 which has a relay 32 therein, said relay operating to control a circuit 29 which in turn controls the valve 83. In this case the character, quality or intensity of the light rays received by the light sensitive cell 840 will vary as the temperature varies, and the device will be so arranged that when the temperature reaches the desired point, the light sensitive cell will become operative to close the circuit 29 and thus close or partially close the valve 83. If the temperature falls below a predetermined point, then the valve 83 will automatically open. In this case, too, an optical quality or characteristic of material during its manufacturing process is made use of to control such process.

In all the above embodiments of my invention variations in radiant energy in the form of light is made use of to accomplish the desired results, but I desire to state that the invention is not limited to the use of radiant energy of this character, but may also be used with other forms of radiant energy.

The factor or factors affecting the production process which are made use of for controlling said process also vary in the various embodiments of the invention above described. In some embodiments this factor is the presence or absence of certain constituents in the material. In other embodiments the factor is the temperature involved. In other processes with which my invention may be used still other factors may be made use of. I wish to make it clear, therefore, that my invention is not limited in its application to variations in any particular factor or factors as the factor which is finally selected for any process will depend largely upon the character of the process involved.

I claim:

1. The combination with means for treating inanimate material during its process of manufacture whereby it undergoes some change, of separate means for producing radiant energy of a character which is affected by factors affecting such treatment of the material, but which does not of itself produce the above-mentioned change in the material, means to subject a portion at least of the material to the action of said radiant energy, whereby variations in such factors cause distinctive variations in said radiant energy, and means controlled by said variations to exercise control over the process.

2. The combination with means for treating inanimate material during its process of manufacture whereby it undergoes some change, of separate means for producing radiant energy of such a character that its passage through said material will be more or less obstructed by factors affecting such treatment thereof, said radiant energy also of such a character that it does not of itself produce the above-mentioned change in the material, means to subject a portion at least of said material progressively to the action of said radiant energy, whereby variations in such factors cause variations in the degree to which the radiant energy is obstructed, and means controlled by such variations to exercise control over the process.

3. The combination with means for treating inanimate material during its process of manufacture whereby it undergoes some change, of separate means for producing radiant energy which is distinctively affected by factors affecting such treatment of the material, means to subject a portion at least of the material to the action of said radiant energy after said material has been so treated, whereby variations in such factors cause variations in the radiant energy, and means controlled by said variations to exercise control over the process.

4. The combination with means for treating inanimate material during its process of manufacture whereby it undergoes some change, of separate means for producing radiant energy, means for subjecting a portion at least of said material to the action of such radiant energy subsequent to the aforementioned treatment thereof, said radiant energy being of a character whereby factors affecting such treatment cause distinctive variations in the radiant energy, and means controlled by said variations in the radiant energy to exercise control over said process.

5. The combination with means for treating inanimate material during its process of manufacture whereby it undergoes some change, of separate means for producing radiant energy, means for subjecting a portion at least of said material to the action of said radiant energy, said radiant energy being of a character whereby factors affecting such treatment cause distinctive variations in the radiant energy, and means controlled by said variations in the radiant energy to exercise such control over the process as to maintain a predetermined character in the product resulting from the process.

6. The combination with means for treating inanimate material during its process of manufacture whereby it undergoes some change, of separate means for producing radiant energy, means for subjecting a portion at least of said material to the action of such radiant energy, means responsive to variations in the radiant energy due to changes in the optical characteristics of said portion of the material distinctive of variations affecting the aforementioned treatment, and means responsive to said variations in the radiant energy to exercise control over the process.

7. The combination with means for treating material whereby it undergoes some change, of separate means for producing radiant energy of a character which is affected by factors affecting such treatment of the material, but which does not of itself produce the above-mentioned change in the material, means to subject a portion at least of the material to the action of said radiant energy, whereby variations in such factors cause distinctive variations in said radiant energy, a device, and means controlled by said variations to actuate said device.

In testimony whereof, I have signed my name to this specification.

LLOYD LOGAN.